G. E. WODRASKA.
HARROW ATTACHMENT.
APPLICATION FILED JULY 27, 1911.
1,009,817.
Patented Nov. 28, 1911.
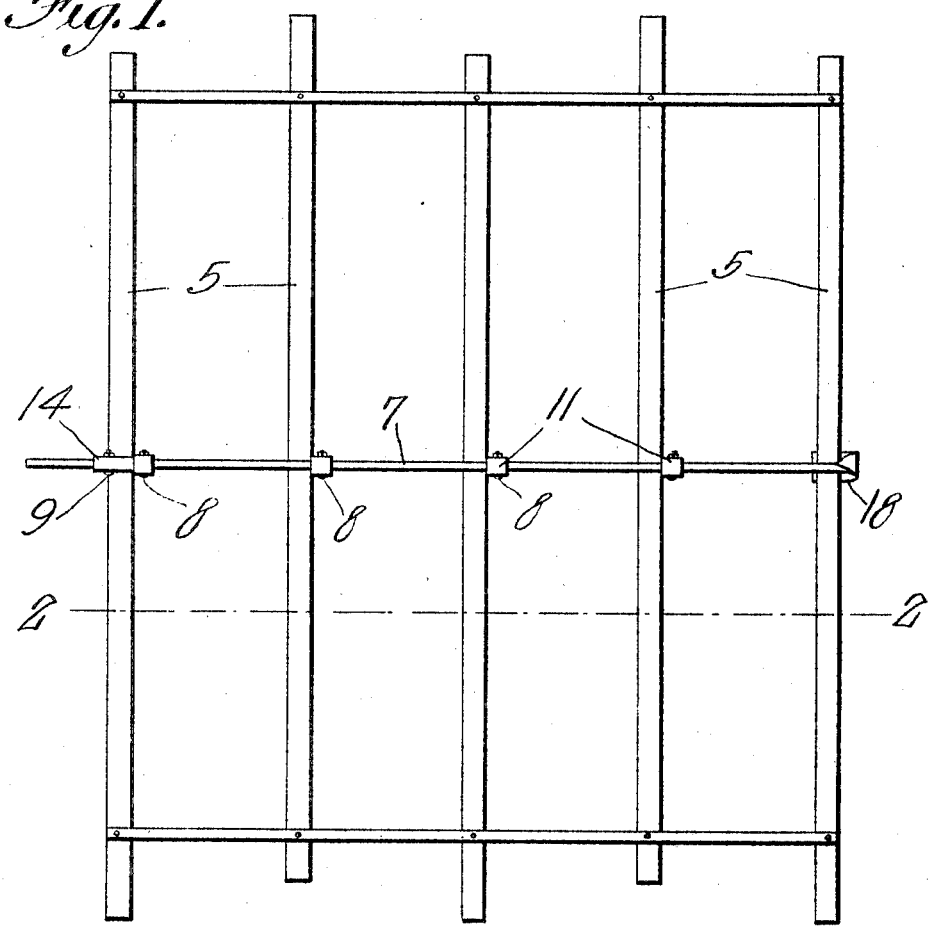
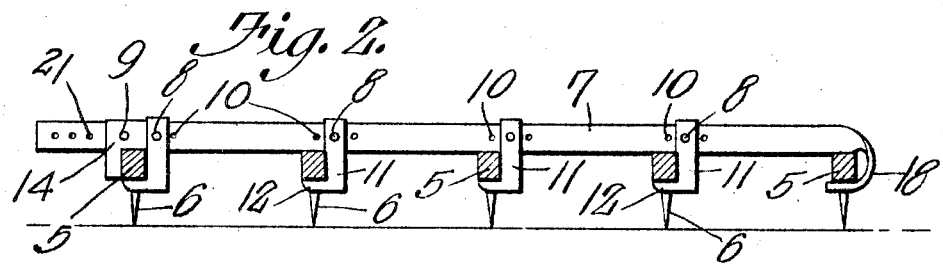
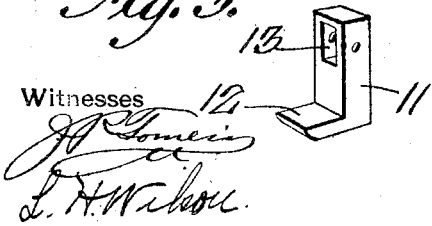
George E. Wodraska
Inventor
by C. A. Snow & Co.
Attorneys
Witnesses

UNITED STATES PATENT OFFICE.

GEORGE E. WODRASKA, OF ACADEMY, SOUTH DAKOTA.

HARROW ATTACHMENT.

1,009,817. Specification of Letters Patent. Patented Nov. 28, 1911.

Application filed July 27, 1911. Serial No. 640,923.

*To all whom it may concern:*

Be it known that I, GEORGE E. WODRASKA, a citizen of the United States, residing at Academy, in the county of Brule and State of South Dakota, have invented a new and useful Harrow Attachment, of which the following is a specification.

This invention is a harrow attachment and has for its object to provide means for bracing flexible and other harrows to stiffen their structures thus facilitating the action of the harrow teeth.

With the above and other objects in view this invention is embodied in the novel construction, arrangement and combination of parts as hereinafter described and as illustrated in the accompanying drawings, in which similar reference characters indicate similar parts, and in which,—

Figure 1 is a plan view of the attachment as applied to a harrow frame. Fig. 2 is a section on the line 2—2 of Fig. 1. Fig. 3 is a perspective of one of the beam engaging members carried by the attachment.

Referring specifically to the drawings, the harrow frame illustrated includes a plurality of parallel beams 5 having the lower harrow teeth 6, which are common in harrow constructions.

The attachment comprises a bar 7 set on edge crosswise or at right angles to the beams 5 and on the upper faces thereof. One extremity of the bar is twisted and hooked as shown at 18 to engage one of the end beams 5 and the said bar is provided with a series of transverse apertures 10 therethrough spaced along its length. The other extremity has a series of transverse apertures 21 therein.

A plurality of blocks 11 having holes 13 therethrough are slidably mounted longitudinally on the bar 7, the bar passing through the holes 13. Said blocks 11 have lips 12 projecting from their lower ends away from the hooked end of the bar and are adjustably secured to the bar by means of bolts 8 passing therethrough and through one of the holes 10. The blocks 11 and lips 12 form the beam engaging members.

A stop 14 is slidable on the end of bar 7 opposite the hooked end and is adjustably secured thereto by a bolt 9 passing through one of the holes 21.

The device is attached to the harrow frame by engaging the hooked end 8 over one of the end beams, the blocks 11 and stop 14 having been previously loosened and the bar 7 is swung over the tops of the other beams 5. The stop 14 is then brought against the outer side of the other end beam 5 and the bolt 9 secured in position to maintain the stop at its adjustment. The blocks 11 are then slid against the respective beams 5 to bring the lips 12 thereinunder and the bolts 8 are inserted to lock the blocks in position. This securely locks the attachment to the harrow frame and strengthens the structure thereof to facilitate the action of the harrow teeth 6 in breaking up the earth and leveling same. Thus the frail structure of a flexible harrow frame can be overcome by securing one of the herein described attachments thereto, the attachment being applicable to various forms of harrows.

The device is simple in construction rendering it cheap to manufacture and is effective in its use.

What is claimed as new is:—

1. An attachment for harrows, comprising a bar having a hook at one end, an adjustable stop mounted on the other end of the said bar, and adjustable beam engaging members carried by said bar.

2. An attachment for harrows, comprising a bar having a hook at one end, an adjustable stop mounted on the other end of the said bar, and blocks slidably arranged on the bar and having lips projecting from the lower ends thereof.

3. An attachment for harrows, comprising a bar having a hook at one end, and a series of apertures therethrough along its length, an adjustable stop mounted at the other end of the bar, a plurality of blocks having holes therethrough through which the said bar passes and having lips projecting from the lower ends thereof away from the hooked end of the bar, and bolts passing through the said blocks and through the holes in the bar.

In testimony that I claim the foregoing as my own, I have hereto affixed my signature in the presence of two witnesses.

GEORGE E. WODRASKA.

Witnesses:
 ANTON STEIMER, Jr.,
 E. N. WAGAR.